3,780,084
PREPARATION OF CYANOALKANE
CARBOXYLIC ACIDS
Sijbrandus E. Schaafsma, Beek, and Johannes H. A. Hofman, Maastricht, Netherlands, assignors to Stamicarbon N.V., Heerlen, Netherlands
No Drawing. Filed Apr. 26, 1972, Ser. No. 247,535
Claims priority, application Netherlands, May 1, 1971, 7105979
Int. Cl. C07c *121/02*
U.S. Cl. 260—465.4           7 Claims

ABSTRACT OF THE DISCLOSURE

Omega-cyanoalkane carboxylic acids are prepared in the high yields by reacting a 1-hydroxycycloalkyl peroxide with the corresponding alkanone and hydrogen cyanide at a reaction mixture pH of between about 3–6 in the presence of a water soluble cuprous cyanide complex as catalyst in the disclosed process.

---

The invention relates to a process for the preparation of cyanoalkane carboxylic acids from 1-hydroxy-cycloalkyl peroxides, such as the preparation of ε-cyano-caproic acid from 1-hydroxycyclohexyl peroxide.

The preparation of cyanoalkane carboxylic acids has been taught in U.S. patent specification 3,026,334 by reacting a 1-hydroxycycloalkyl peroxide in an aqueous medium with an inorganic alkaline cyanide, e.g., potassium cyanide, in the presence of a catalyst. After termination of the reaction, the reaction mixture was acidified and the cyanoalkane carboxylic acid recovered by extraction. The catalyst used in this process is a water-soluble cyanide complex of a variable valence metal, e.g. copper, used in the lower valence state, and which is capable of transferring a cyanide ligand to the radical formed by the rupturing of the peroxide ring.

Said known process has the drawback that the yield of desired product is remarkably low, and that after termination of the reaction the cyanide catalyst has been largely converted into insoluble compounds from which the original compound can be recovered only with great difficulty. Further, owing to the acidification of the resulting reaction mixture, a significant amount of salt, e.g., potassium chloride, is obtained as undesired, uneconomic, byproduct. If in the said known process hydrogen cyanide is used instead of an alkaline cyanide (see U.S. patent specification 2,710,302), then the rate of conversion and also the yield of the desired product is very low.

The present invention provides a process whereby the above-mentitoned drawbacks are avoided and which can be carried out in a simple manner.

The process according to the present invention is for the preparation of cyanoalkane carboxylic acids by reacting a 1-hydroxycycloalkyl peroxide with a cyanide in an aqueous reaction medium in the presence of a catalyst consisting of a water soluble cuprous cyanide complex, and which is characterized in that the process uses as starting material a mixture of the 1-hydroxycycloalkyl peroxide with an amount of the corresponding cycloalkanone, and that the reaction is carried out with hydrogen cyanide at a pH of the reaction mixture between about 3 and 6. The said catalyst is a complex anion consisting of copper and 6 ligands whereby at least one ligand is a cyanide ligand and possibly other ligands are e.g. water, chloride, ammonia and amines. The hydrogen cyanide may be formed in situ e.g. by reaction of sulphuric acid with sodium cyanide or other cyanide. It is however preferred to add hydrogen cyanide as such to the reaction medium.

1-hydroxycycloalkyl peroxides can be prepared in a known manner, e.g., by reacting a cycloalkanone with hydrogen peroxide (see Journal of Organic Chemistry 1958, vol. 23, p. 1322), or by oxidizing a cycloalkanol with molecular oxygen (see Liebig's Annalen der Chemie, volume 706, 1967, p. 81). The starting mixture for the process according to the present invention can thus be obtained by mixing the resulting 1-hydroxycycloalkyl peroxide with the corresponding cycloalkanone used as starting material for the said peroxidation reaction. The starting mixture to be used in the process according to the invention may, of course, also be a reaction mixture obtained in the preparation of the 1-hydroxycycloalkyl peroxide in which mixture the corresponding cycloalkanone is already present, e.g., the reaction mixture obtained by reacting hydrogen peroxide with an excess of the desired cycloalkanone. By means of the process according to the invention various 1-hydroxycycloalkyl peroxides comprising several substituted or non-substituted cycloalkyl groups, such as cyclopentyl, cyclohexyl, cycloheptyl, cyclo-octyl and cyclododecyl can be converted, e.g., in general cycloalkanones having from 5 to about 12 carbon atoms in the ring may be converted to the corresponding 1-hydroxycycloalkyl peroxide, and then on to the corresponding omega-cyanoalkane carboxylic acid. The cycloalkyl group of the peroxide may be substituted with e.g. alkyl groups having from 1–6 carbon atoms.

The efficiency of this invention partly depends on the number of carbon atoms in the ring of the cycloalkyl group and on the presence of substituents in the cycloalkyl group.

In the process according to the present invention it is preferred to use a starting mixture which contains more than 0.1 mole of the corresponding cycloalkanone per mole of peroxide.

The temperature in the process according to the present invention may be varied between about —5° and about 35° C. Preferably, the reaction is carried out at a temperature between about 0–25° C. The pressure as such is in no way critical, but it is convenient to work at atmospheric pressure. The quantity of hydrogen cyanide may, in principle, be equal to the theoretical quantity needed. It is preferred, however, to use about 5–80% more than the theoretical amount to accomplish a complete conversion of the peroxide. In the calculation of the theoretical amount hydrogen cyanide, the copper complex catalyst is assumed to bind two moles of cyanide per mole of copper.

The process according to the invention can be carried out in the presence of an inert solvent for the reactants and reaction products, such as benzene, toluene, methanol, dioxane, and 1,2-dichloroethane. After the reaction has terminated, the reaction mixture can be extracted, e.g., with ether, in order to isolate an aqueous catalyst-containing phase, which can be re-used, and an organic phase, from which unconsumed hydrogen cyanide (if any), the unconverted cycloalkanone and the cyanocarboxylic acid product can be recovered. If use is made of a solvent, a very suitable result can be achieved if about 0.5–5 moles of the corresponding cycloalkanone per mole of peroxide are present in the starting mixture. If no solvent is used, it is preferred for the starting mixture to contain about 4–15 moles of cycloalkanone per mole of peroxide. The resulting reaction mixture then consists of an aqueous phase which contains the catalyst and which can be recycled, and of an organic phase from which the cyanocarboxylic acid and the corresponding cycloalkanone can be recovered. To achieve a better separation of the latter case, one may also extract the whole reaction mixture, e.g., with ether.

In the process according to the invention it is preferred to add the starting mixture—whether or not contained in a solvent—and the hydrogen cyanide simultaneously to the aqueous reaction medium at the desired pH. The catalyst can be prepared, for example, by dissolving a suitable cuprous salt, such as cuprous cyanide, together with sodium cyanide, in water and acidifying the resulting solution to the desired pH, or by adding hydrogen cyanide to an aqueous solution, or suspension, of a suitable cuprous salt and then adjusting the pH. It appears that at a pH within the range of about 3–6 the catalyst possesses a particularly high activity, so that the rate of conversion is practically determined by the question of how fast the heat of reaction can be removed at the desired reaction temperature.

The cyanoalkane carboxylic acids obtained according to the invention are suitable starting products for various other syntheses, such as the preparation of pimelinic acid by hydrolysis of ε-cyanocaproic acid and the preparation of ω-aminooenanthic acid, a starting material for nylon-7, by hydrogenation of ε-cyanocaproic acid.

The process according to the invention will now be further elucidated in the following examples without, however, being restricted thereby in any way whatsoever.

EXAMPLE I

In a flask of 0.5 liter capacity, provided with a stirrer, a solution of 50 g. of cyclohexanone (0.51 mole) in 40 milliliters of dioxane is brought together with a solution of 10 g. of hydrogen peroxide (0.29 mole) in 20 milliliters of water, whereupon the resulting mixture is properly stirred for 1 hour without needing heating or cooling. The reaction mixture and a solution of 9 g. of hydrogen cyanide in 30 milliliters of water are then fed simultaneously, and dropwise, over a period of 20 minutes to a flask of 1 liter capacity (provided with a stirrer) containing an aqueous solution of cuprous cyanide in a nitrogen atmosphere. Said aqueous catalyst solution is prepared by dissolving 5 g. of cuprous cyanide together with 6 g. of sodium cyanide in 150 milliliters of water, and acidifying the resulting solution with sulphuric acid to a pH of 4. The dropwise addition of the reactants to the catalyst solution is carried out with proper stirring, while the temperature of the reaction mixture is kept at 3° C. by cooling.

The reaction mixture (pH about 4.5) is subsequently extracted with ether. The resulting solution in ether is then dried, whereupon the ether and the excess of hydrogen cyanide are removed by evaporation, and the remaining liquid is subjected to fractional distillation, 20.1 g. of cyclohexanone and 28.9 g. of ε-cyanocaproic acid (boiling point 133° C. at 0.3 mm. Hg, melting point 25.5° C., $n_D^{20}=1.4470$). The efficiency is 67% calculated on the amount of cyclohexanone consumed, and 70% calculated on the original amount of hydrogen peroxide.

EXAMPLE II

ε-Cyanocaproic acid is prepared in the same way as described in Example I. The temperature, however, is not 3° C., but 20° C. Calculated on the amount of cyclohexanone consumed, the efficiency is 62%; the efficiency calculated on the original amount of hydrogen peroxide equals 63%.

EXAMPLE III

In conformity with the procedure described in Example I, a solution of 50 g. of cyclohexanone (0.51 mole) in 30 ml. of 1,2-dichloroethane is reacted with a solution of 10 g. of hydrogen peroxide (0.29 mole) in 20 ml. of water. The resulting reaction mixture is separated into an aqueous layer containing 2.2 g. of hydrogen peroxide, and an organic layer containing the organic peroxide. The organic layer is reacted with a solution of 9 g. of hydrogen cyanide in 30 ml. of water at 8° C. in the way described in Example I. The resulting reaction mixture is processed in conformity with Example I, and 33.5 g. of cyclohexanone and 22.3 g. of ε-cyanocaproic acid are obtained. The efficiency is now 94% calculated on the amount of cyclohexanone consumed, and 60% calculated on the amount of hydrogen peroxide consumed.

EXAMPLE IV

A peroxide solution in 1,2-dichloroethane is prepared from cyclohexanone and hydrogen peroxide in the same way as the organic layer in Example III. The solution is reacted at 5° C. with a solution of 9 g. of hydrogen cyanide in 30 ml. of water in the way described in Example I. The catalyst solution needed for this reaction is prepared by suspending 2.5 g. of cuprous cyanide in a solution of 4 g. of hydrogen cyanide in 200 ml. of water, whereupon the pH is adjusted at 3.6 by means of sodium hydroxide (10% by weight).

The resulting solution (pH about 4) is processed as described in Example I, and 32.3 g. of cyclohexanone and 21.4 g. of ε-cyanocaproic acid are obtained. The efficiency is 84% calculated to the amount of cyclohexanone consumed and 67% calculated to the amount of hydrogen peroxide consumed.

EXAMPLE V

In a flask of 1.5 liter capacity, provided with a stirrer, 600 g. of cyclohexanone (6.12 moles) and a solution of 30 g. of hydrogen peroxide (0.88 mole) in 70 ml. of water are brought into reaction, whereupon the resulting mixture is stirred for 2 hours without needing heating or cooling.

The solution thus obtained and a solution of 30 g. of hydrogen cyanide in 70 ml. of water are then simultaneously added for over 30 minutes to a catalyst solution present under nitrogen in a 2 liter flask provided with a stirrer. The catalyst solution is made by dissolving 15 g. of cuprous cyanide and 10 g. of sodium cyanide in 400 ml. of water, acidifying the solution with sulphuric acid to a pH of 6, subsequently adding a solution of 4 g. of hydrogen cyanide in 12 ml. of water and acidifying to a pH of 4.2 by means of sulphuric acid. The dropwise addition of the reactants to the catalyst solution is carried out with proper stirring, while the temperature is kept at 5° C. by cooling. The resulting reaction mixture (pH about 4.5) is extracted with ether at room temperature. After removal of the ether and the excess hydrogen cyanide by evaporation, the remaining liquid is subjected to a fractional distillation treatment in which cyclohexanone-water azeotrope, cyclohexanone and ε-cyanocaproic acid are obtained in succession.

A total of 505.1 g. of cyclohexanone is recovered, and 99.6 g. of ε-cyanocaproic acid are obtained.

The efficiency is 73% calculated on the amount of cyclohexanone consumed, and 80% calculated on the original quantity of hydrogen peroxide.

EXAMPLE VI

The reaction of hydrogen cyanide with the peroxide prepared from cyclohexanone is carried out by means of the same procedure and the same quantities as mentioned in Example V. This time, however, the reaction mixture is separated into an aqueous layer and an organic layer. The aqueous layer is used, after decreasing the pH to about 4.2, as a catalyst solution for preparing a reaction mixture product from the same quantities of reactants and in the same way as described in Example V. The second portion of reaction mixture is in turn separated into an organic layer and an aqueous layer, the latter again being used as catalyst solution for preparing a third portion of reaction mixture. Separating the reaction mixture and reusing the aqueous layer is continued until four organic layers have been obtained. Each quantity of organic layer is subjected to a fractional distillation treatment, while the cyclohexanone and ε-cyanocaproic acid contained in the remaining aqueous layer are recovered by extraction with ether. The quantities obtained are given in the table below:

|  | Recovered cyclohexanone (g.) | Recovered ε-cyanocaproic acid (g.) |
|---|---|---|
| 1st organic layer | 445.2 | 81.3 |
| 2d organic layer | 480.4 | 84.8 |
| 3d organic layer | 514.0 | 95.2 |
| 4th organic layer | 508.5 | 96.4 |
| Aqueous layer | 106.0 | 28.1 |

The total yield of ε-cyanocaproic acid is 385.8 g., which corresponds to an efficiency of 77.5% calculated on the amount of cyclohexanone consumed, and of 77.6% calculated on the amount of hydrogen peroxide consumed.

EXAMPLE VII

In a flask of 0.5 liter capacity provided with a stirrer, 200 g. of cyclopentane (2.38 moles) and a solution of 10 g. of hydrogen peroxide (0.29 mole) in 20 ml. of water are brought together, whereupon the resulting mixture is properly stirred for one and one half hours without needing heating or cooling. In the way described in Example I, the solution so obtained plus a solution of 9 g. of hydrogen cyanide in 30 ml. of water are then added dropwise at 3° C. to a catalyst solution prepared in accordance with Example IV.

After the solutions have been added, the temperature is raised to 25° C. and the mixture is stirred for another thirty minutes at that temperature.

The resulting reaction mixture is processed in the same way as described in Example I, and 182.4 g. of cyclopentanone and 11.6 g. of δ-cyanovaleric acid (boiling point 122° C. at 0.3 mm. Hg, $n_D^{30}=1.4464$, melting point 23° C.) are obtained.

The efficiency is 44% calculated on the amount of cyclopentanone consumed, and 31% calculated on the original amount of hydrogen peroxide.

EXAMPLE VIII

A solution of 90 g. of α-methylcyclohexanone (0.80 mole) in 50 ml. of dioxane is brought into reaction with a solution of 10 g. of hydrogen peroxide (0.29 mole) in 20 ml. of water in the way described in Example I. In conformity with Example I, the reaction mixture and a solution of 10 g. of hydrogen cyanide are then added dropwise at 8° C. to a catalyst solution prepared according to Example I from 5 g. of cuprous cyanide and 6 g. of sodium cyanide, whereupon the resulting solution is acidified to a pH of 5.

The reaction mixture so obtained (pH about 5.8) is processed as described in Example I, and 67.1 g. of α-methylcyclohexanone and 20.3 g. of a fraction (boiling range 135–138° C. at 0.2 mm. Hg, $n_D^{20}=1.4496$) consisting, according to a spectroscopic analysis, of 80% by weight of ε-cyanooenanthic acid and 20% by weight of α-methyl-ε-cyanocaproic acid are obtained.

The efficiency is 64% calculated on the amount of α-methylcyclohexanone consumed, and 44% calculated on the original quantity of hydrogen peroxide.

COMPARATIVE EXAMPLE A

In this example the reaction is conducted using sodium cyanide as a reactant at an alkaline pH and in the presence of the corresponding cycloalkanone.

In the way described in Example I, 50 g. of cyclohexanone in 40 ml. of dioxane are brought into reaction with a solution of 10 g. of hydrogen peroxide in 20 ml. of water. This reaction mixture and a solution of 15 g. of sodium cyanide in 100 ml. of water are fed simultaneously and dropwise over a period of 20 minutes to a flask of 1 liter capacity provided with a stirrer and containing a solution of 5 g. of cuprous cyanide and 6 g. of sodium cyanide in 150 ml. of water under nitrogen. The dropwise addition of the reactants to the catalyst solution is carried out with proper stirring, while the reaction mixture is kept at a temperature of 3° C. by cooling. When the reactants have been added dropwise to the copper cyanide solution, only a part of the peroxide reactant has reacted. The reaction is completed by stirring for one hour at 25° C. The strong alkaline reaction mixture is acidified with sulphuric acid to a pH of 3, and then processed as in Example I, and 26.2 g. of cyclohexanone and 1.3 g. of fraction (boiling range 120–140° C., 0.3 mm. Hg) which, according to spectroscopic analysis, contains 60% by weight of ε-cyanocaproic acid are obtained. The efficiency is 2.3% calculated on the amount of cyclohexanone consumed, and 1.9% calculated on the original amount of hydrogen peroxide.

COMPARATIVE EXAMPLE B

In this example the reaction was conducted using hydrogen cyanide but without the corresponding cycloalkanone.

37.8 g. of 1-hydroxy-1'-hydroperoxydicyclohexylperoxide in the form of a solid substance having a melting point of 77° C. are prepared in a known manner (see Journal of Organic Chemistry 1958, vol. 23, p. 1322) from 49 g. of cyclohexanone and 17 g. of hydrogen peroxide in 34 ml. of water.

In the way described in Comparative Example A, this product is added in small portions and at a temperature of 3° C. to a suspension of 5 g. of cuprous cyanide in 150 ml. of water together with a solution of 10 g. of hydrogen cyanide. No reaction is observed.

COMPARATIVE EXAMPLE C

In this example, as in comparative example B, hydrogen cyanide was used but the cycloalkanone was omitted.

By means of the procedure and the quantities mentioned in Comparative Example B, 1-hydroxy-1'-hydroperoxydicyclohexylperoxide is reacted with hydrogen cyanide; in this case, however the temperature during the addition is 25° C. The reaction proceeds slowly, and five hours later the peroxide has not yet completely converted. The reaction is completed by stirring the reaction mixture for another hour at 32° C. The reaction mixture is then processed in the same way as in Example I, and 10.8 g. of cyclohexanone and 9.2 g. of ε-cyanocaproic acid are obtained. The efficiency is 16.7% calculated on the amount of cyclohexanone consumed, and 13.0% calculated on the original amount of hydrogen peroxide.

It will, of course, be appreciated that the process of this invention can be carried out by modification of this specific procedure set forth in the foregoing examples. In particular, while copper and iron cyanides are preferred catalysts, other lower valence state heavy metal cyanides may also be employed in the equivalent manner, in keeping with the foregoing description of this specification.

We claim:

1. A process for the preparation of cyanoalkano carboxylic acids which comprises reacting at a temperature between about −5 and 35° C. a 1-hydroxy-cycloalkyl peroxide having a cycloalkyl group with between 5 to 12 ring carbon atoms optionally substituted with an alkyl group of 1 to 6 carbon atoms, in the presence of more than 0.1 mole of the corresponding cycloalkanone per mole of said peroxide, in an aqueous reaction medium and in the presence of a catalytic amount of a water soluble cuprous cyanide complex catalyst consisting essentially of copper with 6 ligands where at least one of said ligands is a cyanide ligand, with at least the theoretical amount required of hydrogen cyanide at a pH of the reaction mixture between 3 and 6, whereby said hydroperoxide is converted to said cyanoalkanecarboxylic acid.

2. Process according to claim 1, wherein the reaction is carried out at a temperature between about 0° C. and 25° C.

3. Process according to claim 1 wherein the amount of hydrogen cyanide employed is between about 5% and 80% larger than the theoretical amount required.

4. Process according to claim 1 wherein between about 4 and 15 moles of said cycloalkanone are present per 1 mole of peroxide.

5. Process according to claim 1 wherein the reaction is carried out in the presence of an inert solvent and between about 0.5 and 5 moles of cycloalkanone are present per 1 mole of peroxide.

6. Process according to claim 1 wherein after termination of the reaction, the aqueous catalyst solution is recovered from the reaction mixture and re-used for a second said reaction.

7. Process according to claim 1 wherein the reaction is carried out by adding said peroxide, said cycloalkanone and hydrogen cyanide simultaneously to the aqueous reaction medium maintained at said pH.

References Cited
UNITED STATES PATENTS

| 2,710,302 | 6/1955 | Hyson | 260—464 |
| 3,026,334 | 3/1962 | Minisci | 260—465.4 X |
| 3,346,618 | 10/1967 | Metzger et al. | 260—464 X |
| 3,428,656 | 2/1969 | Weiss et al. | 260—465.4 X |

JOSEPH PAUL BRUST, Primary Examiner

U.S. Cl. X.R.

260—404